Figures 1, 2:
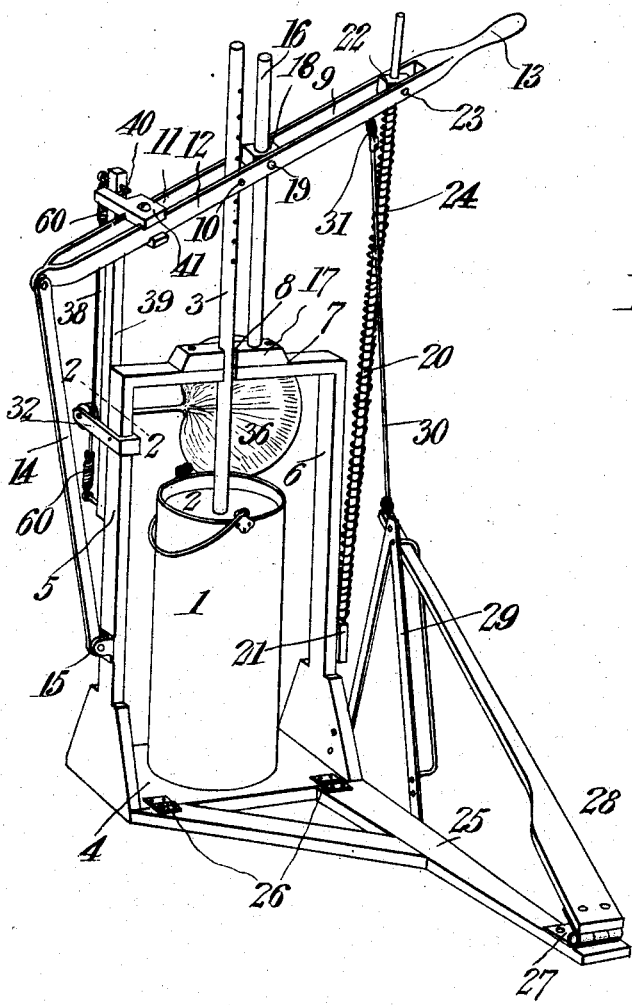

No. 866,334.

PATENTED SEPT. 17, 1907.

W. H. COLMAN.
CHURN OPERATING MECHANISM.
APPLICATION FILED JULY 16, 1907.

WITNESSES:

William H. Colman,
INVENTOR.

By
ATTORNEYS

UNITED STATES PATENT OFFICE.

WILLIAM H. COLMAN, OF PADUCAH, KENTUCKY.

CHURN-OPERATING MECHANISM.

No. 866,334.　　　　Specification of Letters Patent.　　　　Patented Sept. 17, 1907.

Application filed July 16, 1907. Serial No. 383,980.

*To all whom it may concern:*

Be it known that I, WILLIAM H. COLMAN, a citizen of the United States, residing at Paducah, in the county of McCracken and State of Kentucky, have invented a new and useful Churn-Operating Mechanism, of which the following is a specification.

My present invention relates to improvements in mechanism for operating churns and similar devices, and it has for its object to provide improved mechanism of this character that is capable of operating the churn with a minimum expenditure of labor on the part of the operator, and which is capable of performing the churning operation with the greatest efficiency.

Another object of the invention is to provide mechanism of this character that is adapted to be operated either manually or by foot power.

A further object is to provide a novel attachment for the churn that performs a dual function of preventing access of flies to the cream to insure cleanliness, and of fanning the operator when the churn is operated during warm weather.

To these and other ends, the invention comprises the various novel features of construction and combination of parts, which will be hereinafter more fully described, and pointed out particularly in the appended claims.

In the accompanying drawing:—Figure 1 is a perspective view of the churn equipped with operating mechanism constructed in accordance with the present invention. Fig. 2 represents a horizontal section on the line 2—2 of Fig. 1.

Corresponding parts in the several figures are indicated throughout by similar characters of reference.

The operating mechanism shown in the present embodiment of the invention is shown in connection with a churn of well known form embodying generally a barrel or receptacle 1 and a reciprocatory dasher 2, the latter being provided with the usual operating rod or handle 3, although it will be understood, of course, that the invention may be used in connection with churns and similar devices employing a reciprocatory operating element.

The receptacle of the churn is adapted to rest upon the base 4, a pair of uprights 5 and 6 extending upwardly therefrom and provided with a horizontal cross piece 7, the latter having a slot 8 therein to removably receive the operating rod or handle of the churn. An operating lever 9 is attached to the churn handle or operating rod by means of a pin 10 which extends through an aperture in the upper portion of the handle, a plurality of these apertures being preferably provided in order that the operating lever may be attached to the churn handle in different positions longitudinally thereof. In the present instance, the operating lever is composed of a pair of parallel members 11 and 12, the churn handle fitting between them and the connecting pin extending between the members. One end of the operating lever is provided with a handle portion 13 by means of which the churn may be operated manually, and the opposite end of the lever is pivotally attached to the upper end of a link 14, the lower end of the latter being pivotally attached at 15 to one of the standards on the base. The link connection between the relatively stationary portion of the mechanism and the operating lever permits the latter to oscillate while the churn handle moves in a path in alinement with the receptacle. That is to say, the churn dasher and its handle have a rectilinear movement during the oscillatory movement of the operating lever. In order to relieve the churn handle and dasher of the strain of guiding the operating lever, it is preferable to provide a guide 16 which extends in a direction parallel to the axis of the churn and is rigidly attached to the frame of the machine by means of a block 17, the guide coöperating with a cross head 18 which is arranged between the side members of the lever and is capable of rocking on the pivot pin 19 as an axis during the movements of the lever.

The amount of labor required in operating a lever or equivalent part which moves vertically is considerably reduced by affording means for effecting the lifting or returning strokes thereof, and devices for accomplishing this purpose are shown in the present instance, these devices embodying a guide 20 yieldingly attached at 21 to the lower portion of the machine frame, and it is arranged to coöperate at its upper end with a cross head 22, the latter being mounted to turn between the side members of the operating lever and is pivotally attached to the latter by means of a pivot pin 23, a helical compression spring 24 encircling the guide and bearing at its opposite end against the cross head 22 and a relatively fixed portion of the frame, downward movements of the free end of the lever operating to compress the spring, and when the pressure is released from the lever, the latter will rise under the expanding action of the spring. The guide 20 and its coöperating cross head also perform the function of guiding the free end of the operating lever, insuring movement of the latter in a given plane, and preventing its twisting or becoming broken.

In some cases, it may be preferable to provide means whereby the churn may be operated by foot power, and such an attachment is shown in the present embodiment of the invention, it comprising generally an extension 25 which is preferably detachably connected to the base by suitable means, a pair of hinges 26 serving this purpose in the present instance. The outer end of the extension is provided with a hinge 27 which serves as a fulcrum for a treadle 28, the free end of the latter being preferably guided by means of a bracket 29 and it is operatively connected to the operating lever by means of a strap or equivalent device 30, a snap hook or other suitable device 31 being preferably employed between the strap and the operating lever, in order that these parts may be readily attached and detached, as may be desired. Operation of the foot power attachment is obvious, the pressure of the foot on the treadle serving to depress it, and the strap will cause a corresponding movement of the operating lever, the latter serving to cause a plunging movement of the dasher, and when the foot pressure is released, the treadle, as well as the operating lever, will return to normal operative position under the action of the spring 24.

In order to prevent accumulation of flies about the churn and also to insure the comfort of the operator, it is preferable to provide an attachment, such as that shown in the present instance, wherein a single device performs the dual function. This attachment comprises, generally, a bracket 32 which is adjusted vertically on the standard 5, a set screw or equivalent device 33 serving to retain the bracket in different vertical positions thereon. This bracket is provided with a pair of bearing arms 34 in which is journaled a shaft 35, the latter having a socket to receive the handle portion of a fan 36 and it is provided with an operating pulley 37 which is fixed thereon, the pulley being grooved to receive an operating cord 38 which is attached to the opposite ends of a slide 39, the latter being pivotally connected at 40 to a bracket 41 carried by the operating lever, so that oscillatory movement of the latter will cause a longitudinal movement of the operating cord, and the latter will serve to revolve the pulley, rotation of the latter causing a corresponding movement of the fan which revolves alternately in opposite directions. In order to insure ample friction between the operating cord and the fan operating pulley, it is preferable to provide suitable tensioning devices for keeping it taut, those shown in the present instance comprising one or more helical tension springs 60 which serve to connect the end or ends of the cord to the slide. The latter may be guided in any appropriate way, it passing between the arms 34 of the fan supporting bracket, in the present instance. By adjusting the bracket 32 vertically on the coöperating standard, the position of the fan relatively to the churn may be varied, as desired, and it is capable of being reversed relatively to the standard, that is to say, it may be so placed thereon that the fan supporting portion thereof is directed to that side of the machine on which the treadle attachment is located.

Churn operating mechanism constructed in accordance with the present invention is capable of being readily applied universally to churns and similar devices employing a reciprocatory operating element, and in practice it requires a small amount of power to operate it so that the churning operation may be easily performed without fatigue, the return strokes of the dasher being accomplished automatically, and the machine is capable of operation either by the hand or foot. Moreover, the fan attachment not only renders the churning operation comfortable to the operator, but it insures cleanliness in the product by preventing access of flies.

What is claimed is:—

1. In an operating mechanism of the character described, the combination with a suitable base adapted to support the device to be operated, of an operating lever connected to the device having a handle at one end and pivotally connected at its opposite end to the base, and a treadle attachment embodying an extension detachably connected to the base, a treadle pivotally mounted on the extension, and a strap connected to the treadle and detachably secured to the operating lever.

2. In an operating mechanism of the character described, the combination with a base adapted to support the device to be operated, and an operating lever mounted in pivotal relation to the base and operatively connected to the said device, of a bracket arranged in fixed relation to the base, a shaft journaled therein and provided with an operating pulley, a fan operatively connected to the shaft, a slide pivotally connected to the operating lever, and a cord carried by the slide and encircling the said pulley for revolving the fan shaft alternately in opposite directions.

3. In an operating mechanism of the character described, the combination with a base adapted to support the device to be operated, and an operating lever mounted in pivotal relation to the base and operatively connected to the said device, of a bracket arranged in fixed relation to the base, a shaft journaled therein and provided with an operating pulley, a fan operatively connected to the shaft, a slide pivotally connected to the operating lever, a cord carried by the slide and encircling the said pulley for revolving the fan shaft alternately in opposite directions, and a spring interposed between the cord and slide for tensioning the former.

4. In an operating mechanism of the character described, the combination with a base adapted to support the device to be operated, and an operating lever mounted in pivotal relation to the base and adapted to be operatively connected to the said device, of a bracket, a fan shaft journaled in the bracket, a slide operatively connected to the lever and coöperating with the bracket of the guide, means carried by the slide for revolving the fan shaft, and a device for securing the said bracket in different positions of adjustment longitudinally of the slide.

In testimony that I claim the foregoing as my own, I have hereto affixed my signature in the presence of two witnesses.

WILLIAM H. COLMAN.

Witnesses:
W. G. McFadden,
James H. Sullivan.